United States Patent
Daugherty et al.

(10) Patent No.: US 12,543,767 B2
(45) Date of Patent: Feb. 10, 2026

(54) ORAL SUPPLEMENTS CONTAINING ENRICHED PHENOLIC COMPOUND EXTRACTS COMBINED WITH ORGANIC ACID SODIUM SALTS, CREATINES AND/OR CREATINE SALTS

(71) Applicant: Phenolics, LLC, Omaha, NE (US)

(72) Inventors: F. Joseph Daugherty, Omaha, NE (US); Michael S. Tempesta, El Granada, CA (US)

(73) Assignee: Phenolics, LLC

( * ) Notice: Subject to any disclaimer, the term of this patent is extended or adjusted under 35 U.S.C. 154(b) by 308 days.

(21) Appl. No.: 17/716,525

(22) Filed: Apr. 8, 2022

(65) Prior Publication Data

US 2022/0338519 A1    Oct. 27, 2022

Related U.S. Application Data

(60) Provisional application No. 63/166,535, filed on Mar. 26, 2021.

(51) Int. Cl.
*A23L 33/105*    (2016.01)
*A23L 33/175*    (2016.01)

(52) U.S. Cl.
CPC .......... *A23L 33/105* (2016.08); *A23L 33/175* (2016.08)

(58) Field of Classification Search
None
See application file for complete search history.

(56) References Cited

U.S. PATENT DOCUMENTS

2015/0230513 A1*  8/2015  Stone ............... A23L 19/09
                                                          426/89

FOREIGN PATENT DOCUMENTS

| CN | 101033237 A | * | 9/2007 |
| CN | 108850862 A | * | 11/2018 |

OTHER PUBLICATIONS

Lee, Anthocyanin analyses of Vaccinium fruit dietary supplements, 2016, Food Science & Nutrition, 4: 742-752.*
https://gizimu.wordpress.com/wp-content/uploads/2012/05/dictionary-of-food-science-and-nutrition.pdf (Year: 2012).*

Liwei Gu, et al in Concentrations of Proanthocyanidins in Common Foods and Estimations of Normal Consumption, Ameri. Soc. for Nutritional Sciences, 0022-3166/04 © 2004, pp. 613-617.
K. Yokota, et al Analysis of A-Type and B-Type Highly Polymeric Proanthocyanidins and Their Biological Activities as Nutraceuticals, Journal of Chemistry, vol. 2013, Article No. 352042, © 2013.
Robert Krikorian et al, Blueberry Supplementation Improves Memory in Older Adults, J. Agric. Food Chem, 58 (7), 2010, pp. 3996-4000.
Y. McLeay, et al. Effect of New Zealand blueberry consumption on recovery from eccentric exercise-induced muscle damage. J. Int. Soc. Sports Nutr. 2012; 9:19; http://www.jissn.com/content/9/1/19.
K. Levers et al. Effects of powdered Montmorency tart cherry supplementation on an acute bout of intense lower body strength exercise in resistance trained males. J. Int. Soc Sports Nutr. 2015; 12:41.
D.S. Kashi et al. The Efficacy of Administering Fruit-Derived Polyphenols to Improve Health Biomarkers, Exercise Performance and Related Physiological Responses. Nutrients. 2019; 11.doi: 10.3390/nu11102389.
C.H. Park et al. Assessing the Values of Blueberries Intake on Exercise Performance, TAS, and Inflammatory Factors. Iran J. Public Health. 2018;47 Suppl 1:27-32.
Caroline Rae et al. Oral creatine monohydrate supplementation improves brain performance: a double-blind, placebo-controlled cross-over trial, Proc. R. Soc. Lond., B (2003) 270, 2147-50.
J.M. Eckerson, et al. Effect of Thirty Days of Creatine Supplementation with Phosphate Salts on Anaerobic Working Capacity and Body Weight in Men. J. Strength Cond. Res. 2008; 22:826-32.
Jeroen Van Cutsem, et al. Can Creatine Combat the Mental Fatigue-associated Decrease in Visuomotor Skills? Med. & Sci. I Sports & Exercise, © 2019 Amer. Coll. of Sports Med.
S. Lafay, et al. Grape extact improves antioxidant status and physical performance in elite male athletes. J. Sports Sci. Med. 2009; 8:468-80.
B.M. Peeters, et al. Effect of Oral Creatine Monohydrate and Creatine Phosphate Supplementation on Maximal Strength Indices, Body Composition, and Blood Pressure. J. Strength Cond. Res. 1999; 13:3-9.

* cited by examiner

*Primary Examiner* — Terry A McKelvey
*Assistant Examiner* — Catheryne Chen
(74) *Attorney, Agent, or Firm* — McGrath North Mullin & Kratz, PC LLO; Jeanne J. Kelley; Luke C. Holst

(57) ABSTRACT

Oral supplements containing phenolic compounds such as those present in *Vaccinium* and/or *Sambucus*, as well as other genera are enriched in total phenols and combined with either organic acid sodium salts and/or phosphocreatine salts are shown to have enhanced absorption properties. When taken together in an oral supplement, the particular phenolic compound(s) found in such extracts and in other genera containing significant quantities of total phenols are believed to enhance the activity of the phosphocreatine salts in a synergistic manner and result in enhancement of physical activity as well as provide recovery from inflammation.

28 Claims, 6 Drawing Sheets

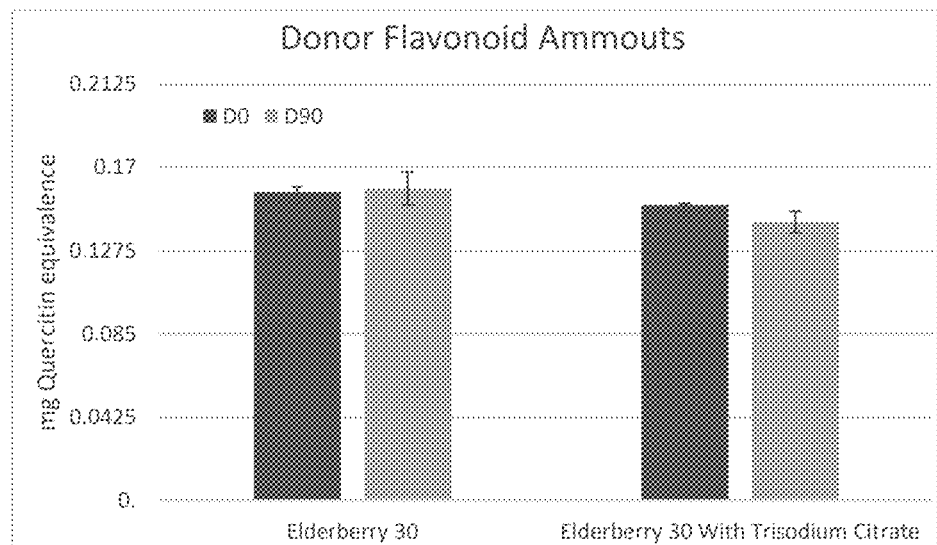
FIG. 7
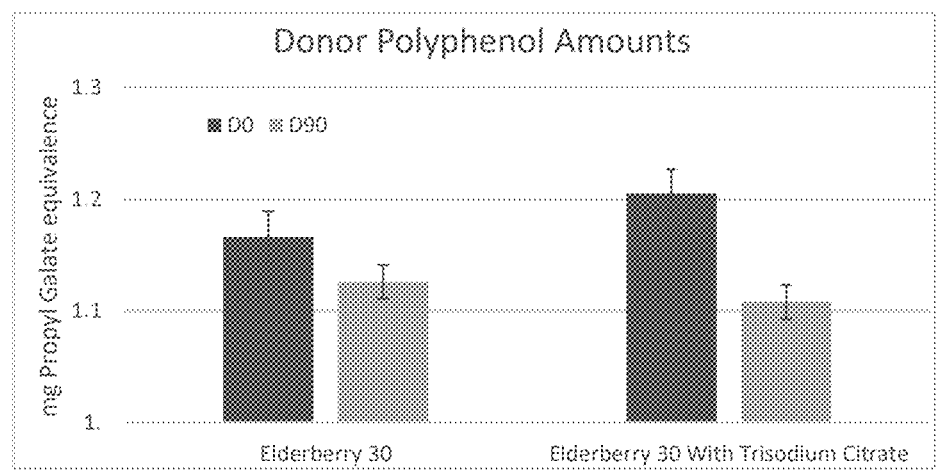
FIG. 8
| MEMBRANE EXTRACTED CONTENT | Elderberry 30 | Elderberry 30 With Trisodium Citrate |
|---|---|---|
| Flavonoids (mg Quercitin equivalent) | 0.0005 ± 0.0001 | 0.0005 ± 0.0001 |
| Polyphenols (mg Propyl galate equivalent) | 0.0217 ± 0.0064 | 0.0140 ± 0.0003 |
FIG. 9

ORAL SUPPLEMENTS CONTAINING ENRICHED PHENOLIC COMPOUND EXTRACTS COMBINED WITH ORGANIC ACID SODIUM SALTS, CREATINES AND/OR CREATINE SALTS

PRIORITY

The present application claims priority of U.S. Provisional Patent Application No. 63/166,535 filed Mar. 26, 2021, which is incorporated herein in its entirety by this reference.

FIELD OF THE INVENTION

Oral supplements with enhanced absorption properties of phenolic extracts together with organic acid sodium salts, creatines and/or creatine salts having utility as supplements for sports nutrition and/or support for anti-inflammatory uses.

BACKGROUND OF THE INVENTION

Dietary supplements include pills, capsules, tablets or liquids intended to be taken to supplement a diet. Supplements are typically extracted from food sources or synthesized wholly or in part. Supplements include nutrients such as amino acids, fiber, minerals and vitamins. Thus, supplements can address nutritional needs.

Phenolic compounds are one of the most important classes of naturally occurring compound classes found in many foods and herbs. The most important and largest class of polyphenols are known as the flavonoids, and include primarily monomers, oligomers and polymers of ellagitannins, proanthocyanidins and anthocyanins, as well as many structural subclasses and naturally occurring derivatives (i.e. isoflavonoids, neoisoflavonoids, flavones, flavans, chalcones, aurones, flavanones, among others minor subclasses).

The anthocyanins and proanthocyanins are naturally occurring compounds widely distributed in foods and found in many fruits, vegetables, grains, which, when extracted and/or synthesized, constitute a group of nutrient supplements available in the United States. More particularly, anthocyanins are naturally occurring compounds that are responsible for the red, purple, and blue colors of many fruits, vegetables, cereal grains, and flowers. For example, the colors of berry fruits (e.g. *Fragaria, Prunus, Ribes, Rubus, Sambucus, Vaccinium, Vitus*), such as blueberries, bilberries, red and black currants, elderberries, grapes, strawberries, raspberries, boysenberries, marionberries, cranberries, are due to many different anthocyanins. Over 300 structurally distinct anthocyanins have been identified in nature. Because anthocyanins are naturally occurring, they have attracted much interest for use as colorants for foods and beverages.

Interest in anthocyanin pigments has intensified because of their possible health benefits as dietary antioxidants. For example, anthocyanin pigments of bilberries (*Vaccinium myrtillus*) have long been used for improving visual acuity and treating circulatory disorders. There is experimental evidence that certain anthocyanins and flavonoids have anti-inflammatory properties. In addition, there are reports that orally administered anthocyanins are beneficial for treating diabetes and ulcers and may have antiviral and antimicrobial activities. The chemical basis for these desirable properties of flavonoids is believed to be related to their antioxidant capacity. Thus, the antioxidant characteristics associated with berries and other fruits and vegetables have been attributed to their anthocyanin content.

Proanthocyanidins are another class of polyphenols that are widely found in fruits and vegetables and, while being colorless, have antioxidant activities. As the term is commonly used, proanthocyanidins are antioxidant flavonoids with possible health benefits, found in many plant sources, including apples, bilberries, black currants, blueberries, chokeberries, cocoa/chocolate, cranberries, grapes, grapeseed, hazelnuts, pecans, pecans, pistachios, pine bark and teas (*Camellina sinensis*).

Proanthocyanins are a class of compounds related to proanthocyanidins containing a glycoside portion. However, because the glycosidic moieties of proanthocyanins can be easily separated from the phenolic portion (such as during digestion), the in vivo activity of proanthocyanins is expected to closely track that of proanthocyanidins. Accordingly, as used herein, the term proanthocyanin is intended to encompass proanthocyanins and proanthocyanidins.

The amount of proanthocyanidins in different foods varies widely, as was reported by Liwei Gu, et al in *Concentrations of Proanthocyanidins in Common Foods and Estimations of Normal Consumption, Amer. Soc. for Nutritional Sciences*, 0022-3166/04 © 2004, pp. 613-17. As reported therein, of the various fruits tested, only lowbush blueberries, cranberries, and choke berries had significant total proanthocyanidins, mostly A-type or B-type proanthocyanidins. It should be noted that while total proanthocyanidins in both dried grape seed and grape extract were also very abundant, from the literature these are known to be only type B or B-type proanthocyanidins. Also, the total proanthocyanidins in both green and black teas (*Camellina*) are known to be mostly type B or B-type in structure.

It has also been found that the biological properties of proanthocyandins can vary. K. Yokota, et al describe in a publication entitled *Analysis of A-Type and B-Type Highly Polymeric Proanthocyanidins and Their Biological Activities as Nutraceuticals, Journal of Chemistry*, Vol. 2013, Article No. 352042, © 2013, how degradation products from extracts of seed shells of the Japanese horse chestnut, blueberry and cranberry were compared. They compared degradation products having A-type linkages with those having B-type linkages and concluded that "the isolated fractions with high molecular sizes and those more abundant in proportions of A-type linkages were found to be more effective in the inhibition of pancreatic lipase activity." They further that their "results suggest that A-type highly polymeric proanthocyanidins are promising for the attenuation of lipid digestion as a dietary supplement."

Blueberries are known to contain phenolic compounds, including both anthocyanins and proanthocyanins, which have antioxidant and anti-inflammatory effects. As reported by Robert Krikorian at al, *Blueberry Supplementation Improves Memory in Older Adults*, J. Agric. Food Chem, 58 (7), 2010, pp. 3996-4000, anthocyanins have been associated with increased neuronal signaling in brain centers mediating memory function as well as improved glucose disposal, benefits that would be expected to mitigate neurodegeneration. Investigation of the effects of daily consumption of wild blueberry juice in a sample of nine older adults with early memory changes are as follows: at 12 weeks, improved paired associate learning ($p=0.009$) and word list recall ($p=0.04$) was observed. The findings of this study suggested that moderate-term blueberry supplementation can confer neurocognitive benefit.

Such purified plant extracts containing concentrations of anthocyanins and proanthocyanins are now widely used as nutraceuticals and pharmaceuticals. One preferred source is blueberries, classified in the Section *Cyanococcus* in the genes *Vaccinium*, with commercial sources including *Vaccinium angustifolium, V. boreale, V. caesariense, V. corybosum, V. darrowii, V. elliottii, V. formosum, V. fuscatum, V. hirsutum, V. myrsinites, V. myrtilloides, V. pallidum, V. simulatum, V. tenellum, V. virgatum.* For example, a blueberry extract available under the tradename "Micro Ingredients" is labeled as an Organic Blueberry Extract 50:1 Concentrate Powder from *Vaccinium cyanococcus*. It is labeled as sustainably grown in Canada to be used as a natural flavor for beverage, smoothie, baking and cookies, with no GMOs. The product is further described as rich in antioxidants, enzyme, flavonoids, anthocyanin, minerals (zinc, potassium, magnesium, calcium), amino acids, polyphenols, fiber and vitamins (vitamin B2, vitamin B12, vitamin C, vitamin D3, and biotin). A serving size is described as 800 mg with two servings suggested daily.

Furthermore, while polyphenols have antioxidant and anti-inflammatory properties, less is known about the specific influences of polyphenol supplementation on muscular strength, power, and endurance. So, while it is known that blueberries have significant antioxidant functionality and that ingestion of antioxidants, both in the form of raw blueberries and related supplements can reduce the oxidative stress which accompanies exercise-induced muscle damage quantification of these phenomena is relatively recent. For example, in 2012, the efficacy of pre- and post-exercise ingestion of blueberries (in the form of smoothies) was studied by examining the recovery period and determining periods where there was an increased rate of recovery. See Y. McLeay, et al. *Effect of New Zealand blueberry consumption on recovery from eccentric exercise-induced muscle damage. J. Int. Soc. Sports Nutr.* 2012; 9:19; http://www.jissn.com/content/9/1/2019. It was found that the ingestion of pre- and post-exercise blueberry smoothies accelerated recovery of muscle peak isometric strength. Interestingly it appeared that this effect was independent of the beverage's inherent antioxidant capacity, and may involve up-regulation of endogenous antioxidant processes, activated by combined actions of the exercise and the blueberry consumption.

Similarly, K. Levers, et al. reported in *Effects of powdered Montmorency tart cherry supplementation on an acute bout of intense lower body strength exercise in resistance trained males. J. Int. Soc Sports Nutr.* 2015; 12:41, that short term supplementation of a powered tart cherry supplement prior to and following stressful endurance exercises affects markers of muscle damage, inflammation, oxidative stress and/or muscle soreness. More particularly they concluded that such short-term supplementation resulted in attenuated markers of muscle catabolism, reduced immune and inflammatory stress and increased performance in aerobically trained individuals.

Indeed, D. S. Kashi, et al. have reviewed publications reporting that fruit-derived polyphenol supplementation can be used to enhance exercise performance. Ingestion of polyphenols and that the polyphenol supplementation has effect which seems to be related an enhanced endogenous antioxidant capacity. See *The Efficacy of Administering Fruit-Derived Polyphenols to Improve Health Biomarkers, Exercise Performance and Related Physiological Responses. Nutrients.* 2019; 11. doi: 10.3390/nu11102389.

One study published in 2018 attempted to specifically determine whether supplementation with blueberries could affect exercise performance time, $VO_2$ max, inflammation markers, insulin levels and TAS levels. See, C. H. Park, et al. *Assessing the Values of Blueberries Intake on Exercise Performance, TAS, and Inflammatory Factors. Iran J. Public Health.* 2018; 47 Suppl 1:27-32. The publication reported that exercise performance time and $VO_2$ max were significantly increased from a first period to a second period.

Another supplement, creatine, is heavily used a dietary supplement for performance enhancement by athletes. This is because the creatine, once present muscle tissue where it is stored as creatine phosphate, reacts with adenosine diphosphate (ADP) to restore adenosine triphosphate (ATP) levels and provide energy needed for muscle activity. By ingesting creatine, athletes are able to load their muscle tissue with higher levels of creatine phosphate and are able to better sustain muscle activity.

Although different forms of creatine are used in oral supplements, creatine monohydrate (CM) is a common delivery form due to its high bioavailability and stability. However other forms of creatine have been studied, and although CM is well established as an effective delivery form, there are side effects when ingested, the more commonly reported side effects being nausea, stomach pain, diarrhea, muscle cramps, and weight gain.

Creatine has many commercial forms, including creatine monohydrate, creatine hydrochloride, creatine ethyl ester, buffered creatine salts and chelated creatine, including creatine magnesium chelate. Phosphocreatine has been successfully used as an infusion for decades for cardio-protection during heart surgery and myocardial problems, although its use as a supplement has been very limited. The phosphocreatine salts are the phosphocreatine disodium salt, phosphocreatine dipotassium salt and phosphocreatine di(tris) salt. However, creatine supplementation has also been studied for its effect on not just athletic performance but also with in regard to mental fatigue and age-related diseases. For example, Caroline Rae et al, reported in *Oral creatine monohydrate supplementation improves brain performance: a double-blind, placebo-controlled cross-over trial, Proc. R. Soc. Lond., B* (2003) 270, 2147-50. In this study, 5 g/day of creatine supplementation for six weeks was given to vegetarian subjections. Positive results were reported for working memory and for intelligence.

Research relating to creatine supplementation is ongoing. One publication described a study involving 30 days of single-dose creatine supplementation with phosphate salts on body weight and anaerobic working capacity. See J. M. Eckerson, et al. *Effect of Thirty Days of Creatine Supplementation with Phosphate Salts on Anaerobic Working Capacity and Body Weight in Men. J. Strength Cond. Res.* 2008; 22:826-32. The publication concludes that body weight significantly improved for test participants who ingested the creatine supplementation with phosphate salts as compared to those participants who ingested dextrose placebos, but that the anaerobic working capacity was not significantly different in the creatine supplementation participants as compared to the placebo participants.

More recently Jeroen Van Cutsem, et al, asked *Can Creatine Combat the Mental Fatigue-associated Decrease in Visuomotor Skills? Med. & Sci. J Sports & Exercise,* ©2019 *Amer. Coll. of Sports Med*. This publication touches on the possible relationship between the benefits of creatine supplement on the brain and exercise wherein the creatine is related to performance in both areas.

Indeed, a month-long, daily creatine supplementation period has been shown to increase muscle creatine concentrations and improve exercise performance [9-13]. In particular, it has been demonstrated that 28 days of 3.0 grams per day of creatine supplementation resulted in approximately a 20% increase in total muscle creatine.

S. Lafay, et al. *Grape extract improves antioxidant status and physical performance in elite male athletes.* J. Sports Sci. Med. 2009; 8:468-80.

B. M. Peeters, et al. *Effect of Oral Creatine Monohydrate and Creatine Phosphate Supplementation on Maximal Strength Indices, Body Composition, and Blood Pressure.* J. Strength Cond. Res. 1999; 13:3-9.

Numerous studies have demonstrated the efficacy of creatine supplementation for improvements in exercise performance, however, few studies have examined the effects of phosphocreatine supplementation on exercise performance. Thus, the purpose of the present study discussed below was to compare the effects of 28 days of supplementation with phosphocreatine disodium salts plus blueberry extract (PCDSB), creatine monohydrate (CM), and placebo on measures of muscular strength, power, and endurance.

The foregoing discussion of functional features are of component classes that provide advantages for the present invention which contains more than one component. This will be apparent from the following more detailed descriptions of preferred embodiments of the invention as particularly pointed out in the appended claims.

BRIEF SUMMARY OF THE INVENTION

The preferred compositions and methods of the present invention utilize phenolic compounds found in *Prunus* (blackberries and cherries), *Ribes* (currants), *Vitus* (grapes), *Rubus* (raspberries), *Fragaria* (strawberries), teas (*Camellia sinensis* and *Camellina* spp *Vaccinium* and *Sambucus* extracts enriched in total phenols, in combination with organic acid sodium salts to create novel supplements with enhanced bioabsorption properties. Such enriched phenolic extracts, especially when combined with creatine and/or phosphocreatine salts creates an oral supplement with particular utility in the sports nutrition area. When taken together in an oral supplement, the particular phenolic compound(s) found in such extracts, are believed to enhance the activity of the phosphocreatine salts in a synergistic manner and result in enhancement of physical activity and/or recovery from muscular inflammatory stress resulting from physical activity.

The most preferred sources of the extracts enriched in total phenols for inclusion in the oral supplements of the present invention include species of genus *Vaccinium*, including *V. angustifolium*, *V. boreale*, *V. caesariense*, *V. corybosum*, *V. darrowii*, *V. elliottii*, *V. formosum*, *V. fuscatum*, *V. hirsutum*, *V. myrsinites*, *V, myrtilloides*, *V. pallidum*, *V. simulatum*, *V. tenellum*, *V. virgatum*, as well as species of genus *Sambucus*, including *S. Nigra*, extracts. Enriched extracts from genera *Prunus* (blackberries and cherries), *Ribes* (currants), *Vitus* (grapes), *Rubus* (raspberries), *Fragaria* (strawberries) and teas (*Camellia sinensis* and *Camellina* spp.) are less preferred for inclusion in the oral supplements of the present invention but are generally acceptable.

Creatines having particular utility when included in the oral supplements of the present invention, when combined with an organic acid sodium salt include creatine monohydrate, creatine hydrochloride and phosphocreatine salts. Phosphocreatine salts having particular utility in the present invention include phosphocreatine disodium salt, phosphocreatine dipotassium salt and phosphocreatine di(tris) salt.

BRIEF DESCRIPTION OF FIGURES

FIG. 7 illustrates donor chamber flavonoid content over time for the elderberry extracts of FIG. 5, according to aspects of the present disclosure.

FIG. 8 illustrates donor chamber phenolic content over time for the elderberry extracts of FIG. 6, according to aspects of the present disclosure.

FIG. 9 illustrates membrane extracted content data for flavonoids and polyphenols of the elderberry extracts with and without trisodium citrate, according to aspects of the present disclosure.

DETAILED DESCRIPTION OF THE INVENTION

Figure 1:
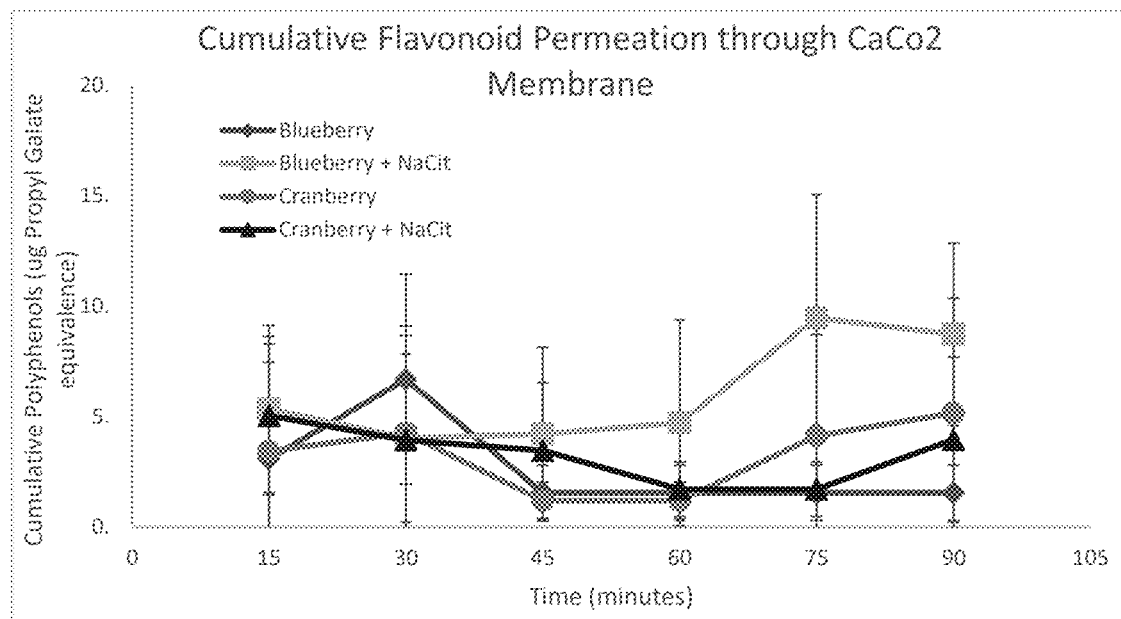
FIG. 1 illustrates flavonoid permeation through a CaCo2 monolayer for of blueberry and cranberry extracts in the presence and absence of trisodium citrate, according to aspects of the present disclosure.
Figure 2:
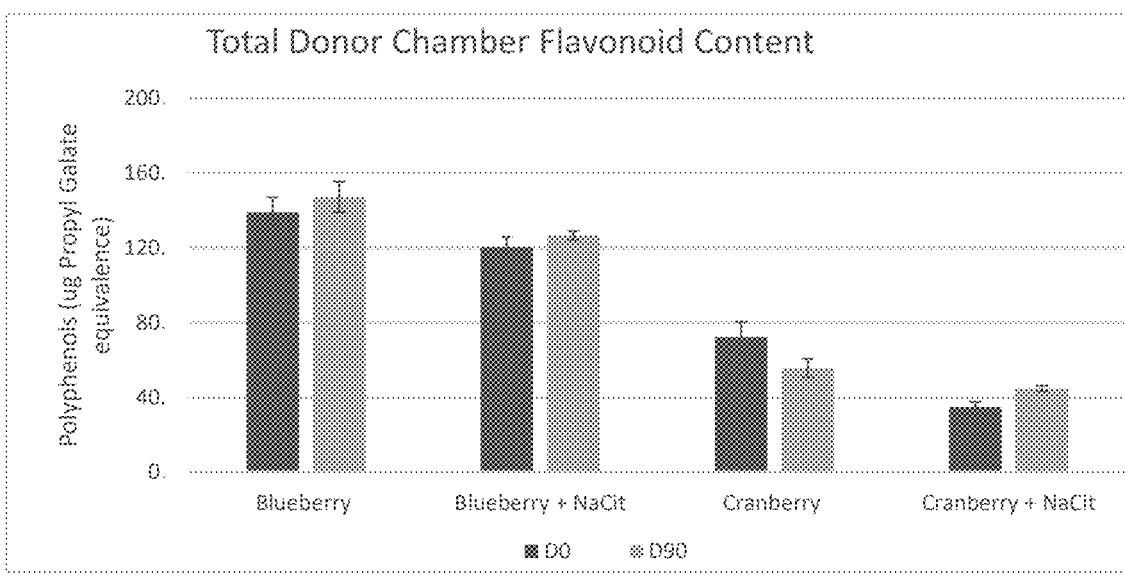
FIG. 2 illustrates donor chamber flavonoid content over time for the blueberry and cranberry extracts of FIG. 1, according to aspects of the present disclosure.
Figure 3:
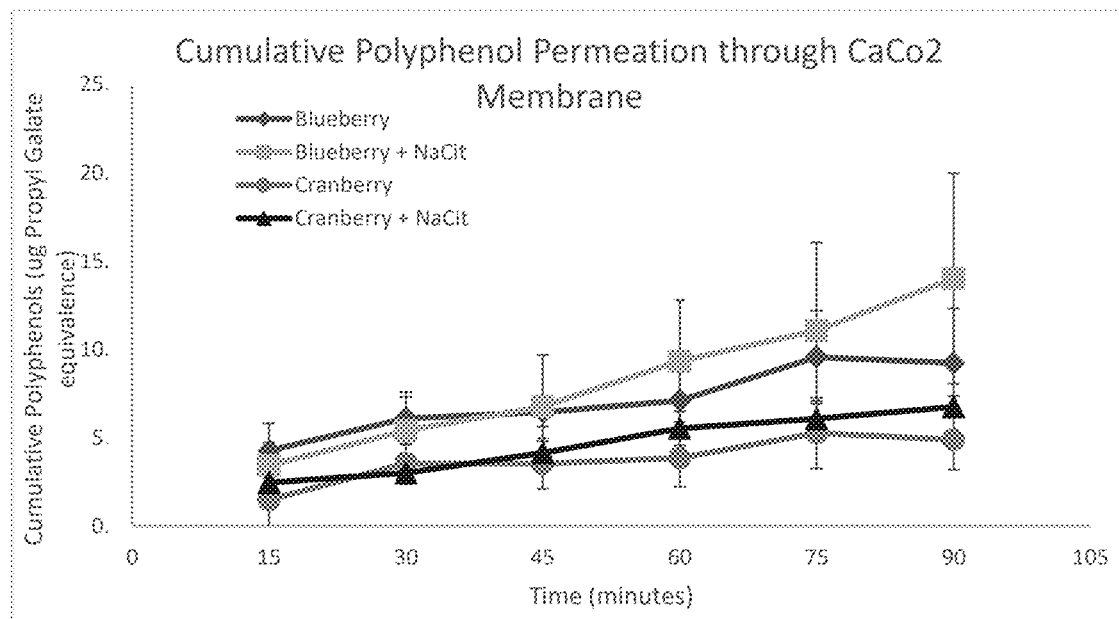
FIG. 3 illustrates phenolic compound permeation through a CaCo2 monolayer for of blueberry and cranberry extracts in the presence and absence of trisodium citrate, according to aspects of the present disclosure.
Figure 4:
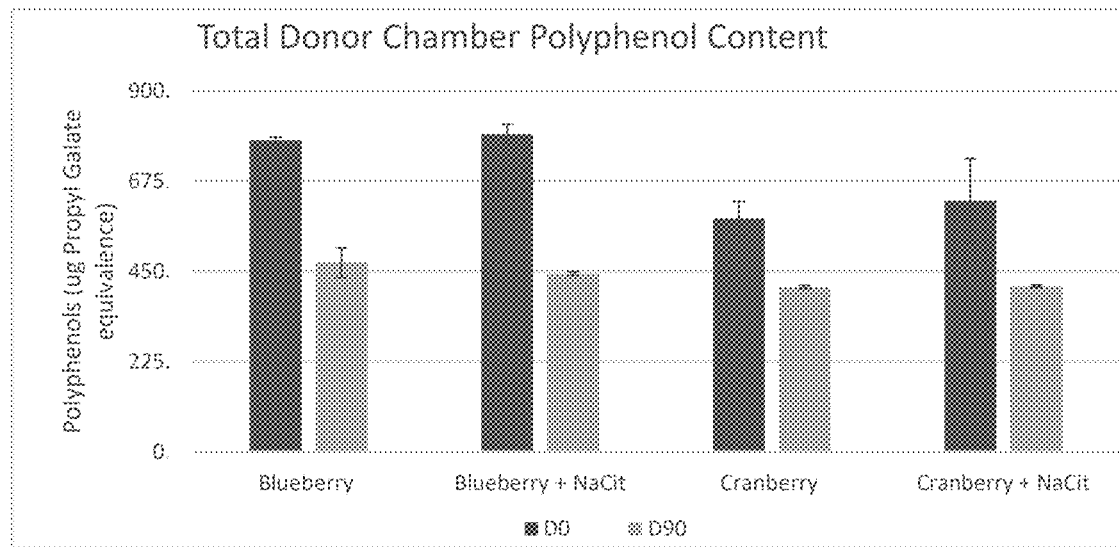
FIG. 4 illustrates donor chamber phenolic content over time for the blueberry and cranberry extracts of FIG. 3, according to aspects of the present disclosure.
Figure 5:
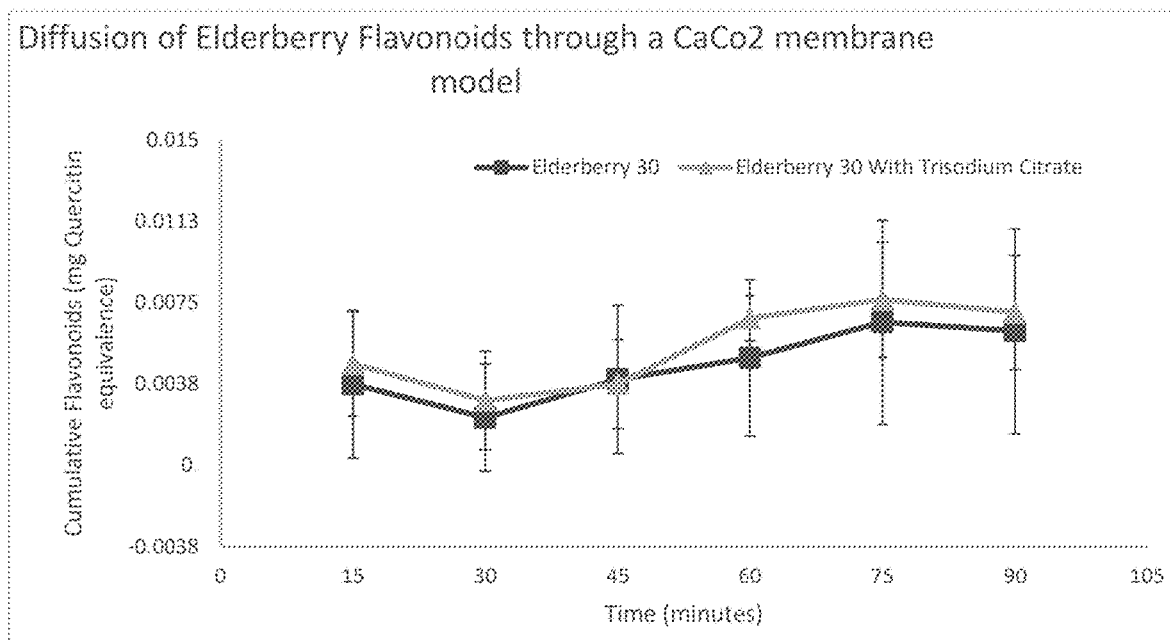
FIG. 5 illustrates flavonoid permeation through a CaCo2 monolayer for elderberry extracts with and without trisodium citrate, according to aspects of the present disclosure.
Figure 6:
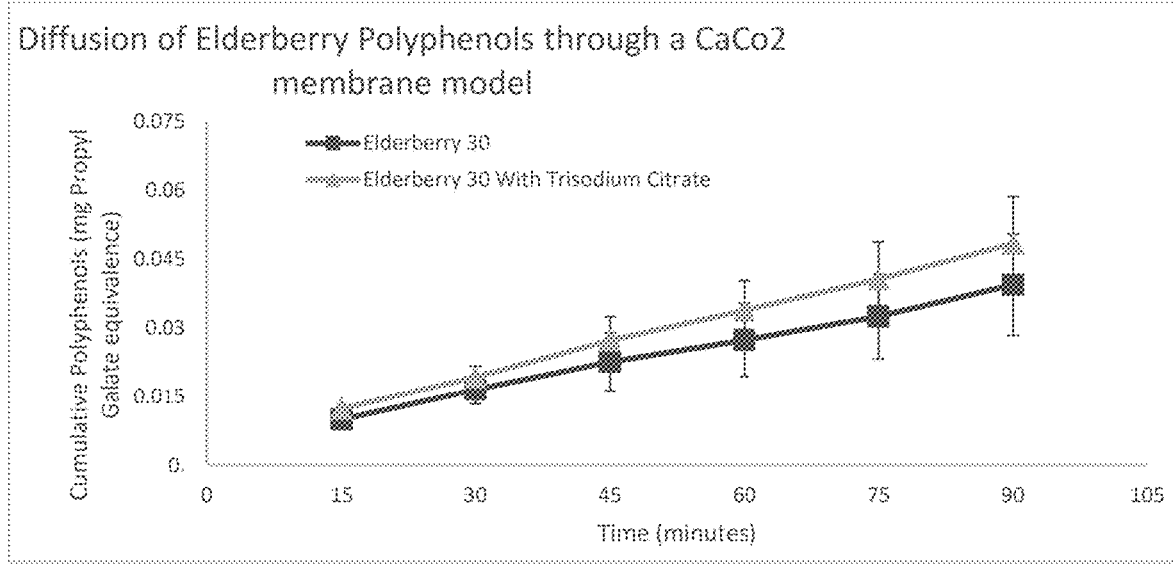
FIG. 6 illustrates phenolic compound permeation through a CaCo2 monolayer for elderberry extracts with and without trisodium citrate, according to aspects of the present disclosure.

Oral supplements containing phenolic compounds such as those present in *Prunus* (blackberries and cherries), *Ribes* (currants), *Vitus* (grapes), *Rubus* (raspberries), *Fragaria* (strawberries), teas (*Camellia sinensis* and *Camellina* spp) *Vaccinium* and *Sambucus* extracts enriched in total phenols, also contain organic acid sodium salts, creatine and/or creatine salts to create novel supplements with enhanced bioabsorption properties. When taken together in an oral supplement, the particular phenolic compound(s) found in such extracts and in other fruits and plant foods containing significant quantities of anthocyanins and proanthocyanins are believed to enhance the activity of the phosphocreatine salts in a synergistic manner and result in enhancement of physical activity and/or recovery from muscular stress and inflammation occurring as a result of physical activity.

The most preferred embodiments of the compositions and methods of the present invention utilize phenolic compounds found in *Vaccinium* and/or *Sambucus*, with blueberry and/or bilberry extracts enriched in total phenols favored in combination phosphocreatine disodium salts to produce an oral supplement. When taken together in an oral supplement, the particular phenolic compound(s) founds in such extracts are believed to enhance the activity of the phosphocreatine disodium salts in a synergistic manner and result in enhancement of physical activity and/or recovery from muscular stress and inflammation occurring as a result of physical activity.

Furthermore, it is believed significant that the extracts used in the compositions and methods of the present invention utilized extracted enriched in total phenols. To obtain such an extract enriched in total phenols, it is preferable that a crude extract, such as, for example, a fruit juice, contains phenolic compounds such as proanthocyanidins, anthocyanins and other phenolics, together with undesired non-phenolic materials such as sugars, organic acids, pectin, plant sterols, fatty acids, starches, triglycerides, and other compounds. Note that herein, the terms "phenols" and "phenolic compounds" are used interchangeably and include monomeric, oligomeric and polymeric compounds having one or more phenolic groups, and include, but are not limited to, anthocyanins, proanthocyanidins, and flavonoids. To achieve an extract enriched in total phenols, preferably, any solid residue which may be contained in the crude extract is separated from the liquid portion, and the solids are either re-extracted as described above or discarded.

As used herein, the term "extract" refers to a substance derived from a plant source that naturally contains phenolic compounds, including extracts prepared from the whole plant or from various parts of the plant, such as the seeds, fruits, skins, vegetables, nuts, tree barks, leaves and other plant materials that are well known to contain phenolic compounds, although in the most preferred embodiments of the present invention, it is the fruits which are used. Examples of plants, fruits, berries, and vegetables that contain phenolic compounds include, but are not limited to, blueberries, bilberries, elderberries, plums, blackberries, strawberries, red currants, black currants, cranberries, cherries, raspberries, grapes, currants, hibiscus flowers, bell peppers, beans, peas, red cabbage, purple corn, and violet sweet potatoes. Other examples include cacao, coffee, cinnamon, olive and tea.

To obtain an "extract enriched in total phenols" as that phrase is used herein, the relative levels of phenolic compounds naturally in the fruit or other plant parts from which the extracts are sources must be enriched in concentration over the concentration of non-phenolic compounds naturally occurring in the source fruit or other plant parts. These non-phenolic compounds include, but are not limited to, sugars, organic acids, cellulose, starches, pectin, amino acids, proteins, nucleic acids, plant sterols, fatty acids, and triglycerides. In other words, the term "extract enriched in total phenols" refers to a composition enriched in one or more phenolic compounds and also having substantially depleted levels of non-phenolic compounds present in crude extracts of the source plants, fruits, berries, and vegetables. The simple process of juicing a fruit or berry and/or merely the juice is insufficient to produce an extract enriched in total phenols, as the non-phenolic compounds including organic acids and sugars are likely still present and highly predominant.

Example 1

To determine differences, if any, on membrane permeability (as an indication of differences in bioavailability) of blueberry and cranberry extracts in the presence and absence of trisodium citrate, and organic acid citrate, a study was undertaken. More particularly, the purpose of the study was to examine the effect of trisodium citrate (10 mM) on diffusion of polyphenols from using CaCo2 cell model for intestinal barrier. In this study, 3 mL of blueberry and cranberry 30% solution (~1 mg/ml in 0.1M DPBS) in the presence or absence of 10 mM trisodium citrate was added to the donor chamber of each of 3 side by side diffusion cells with a confluent CaCo2 monolayer between (TEER ~900 Ohm*cm2). Samples were taken at 15 minute intervals for 90 minutes and replaced with fresh isotonic DPBS. Samples were taken from donor chamber at time 0 and at 90 minutes. In addition to donor and receiver chamber samples, membranes were removed and extracted using 0.5 ml 70% ethanol. Samples were analyzed using modifications of the Folin-Ciocalteu method for total phenolic content and the aluminum chloride method for total flavonoid content. The results for these studies are shown in FIGS. 1-4, with supporting data summarized in TABLES 1-4 below. Note that that flavonoid diffusion is at or below the limit of quantification for all receiver samples. Flavonoid membrane studies are also below limit of quantification.

These results suggest that the presence of trisodium citrate has significant impact on the permeability of blueberry phenolic compounds through a CaCo2 monolayer, while the cranberry phenols permeability is only slightly improved, but still positive.

Tables 1-4

TABLE 1

| | | Averages | | |
|---|---|---|---|---|
| | Blueberry | Blueberry + NaCit | Cranberry | Cranberry + NaCit |
| 15 min | 3.228426396 | 6.644670051 | 5.883248731 | 6.644670051 |
| 30 min | 6.558375635 | 7.498307953 | 5.985617597 | 7.650592217 |
| 45 min | 3.094754653 | 4.944162437 | 3.200507614 | 5.47715736 |
| 60 min | 1.800338409 | 6.269035533 | 3.482233503 | 4.688663283 |
| 90 min | 3.779187817 | 11.20135364 | 8.166666667 | 8.164128596 |

TABLE 2

| | | Standard Deviations | | |
|---|---|---|---|---|
| | Blueberry | Blueberry + NaCit | Cranberry | Cranberry + NaCit |
| 15 min | 4.111355506 | 1.574422581 | 3.010798503 | 0.997303691 |
| 30 min | 4.658826079 | 1.733378458 | 4.361388576 | 1.986228681 |
| 45 min | 0.950240912 | 3.815573214 | 1.184538912 | 2.070385741 |
| 60 min | 0.928120763 | 4.064194424 | 2.28118612 | 2.836788707 |
| 75 min | 1.329142257 | 5.625602821 | 3.900392541 | 0.416681912 |
| 90 min | 0.588398375 | 1.696804227 | 5.106871594 | 1.73508589 |

TABLE 3

| | | Standard Deviations | | |
|---|---|---|---|---|
| | Blueberry | Blueberry + NaCit | Cranberry | Cranberry + NaCit |
| 0 min | 142.3248731 | 122.9340102 | 73.39086294 | 34.91370558 |
| 90 min | 151.213198 | 129.9949239 | 56.74619289 | 45.62944162 |

TABLE 4

| | Standard Deviations | | | |
|---|---|---|---|---|
| | Blueberry | Blueberry + NaCit | Cranberry | Cranberry + NaCit |
| 0 min | 8.069629218 | 5.748380778 | 8.463620305 | 2.682201993 |
| 90 min | 8.360700422 | 2.424887495 | 5.127154841 | 1.519454776 |

Example 2

A further study was undertaken to explore Caco2 uptake of an elderberry extract with and without the addition of trisodium citrate. More particularly, the purpose of this study was to examine the effect of trisodium citrate (10 mM) on diffusion of polyphenols from using CaCo2 cell model for intestinal barrier. In brief 3 mL of elderberry 30% solution (~1 mg/ml in 0.1M DPBS) in the presence or absence of 10 mM trisodium citrate was added to the donor chamber of each of 3 side by side diffusion cells with a confluent CaCo2 monolayer between (TEER ~900 Ohm*cm2). Samples were taken at 15 minute intervals for 90 minutes and replaced with fresh isotonic DPBS. Samples were taken from donor chamber at time 0 and at 90 minutes. In addition to donor and receiver chamber samples, membranes were removed and extracted using 0.5 ml 70% ethanol. Samples were analyzed using modifications of the Folin-Ciocalteu method for total phenolic content and the aluminum chloride method for total flavonoid content. The results for these studies are represented in FIGS. 5-9, again noting that flavonoid diffusion is at or below the limit of quantification for all receiver samples. Flavonoid membrane studies are also below limit of quantification. In any case, the results illustrated below suggest that the presence of trisodium citrate has a small positive impact on the permeability of phenolic compounds through a CaCo2 monolayer.

Example 3

Figure 10:
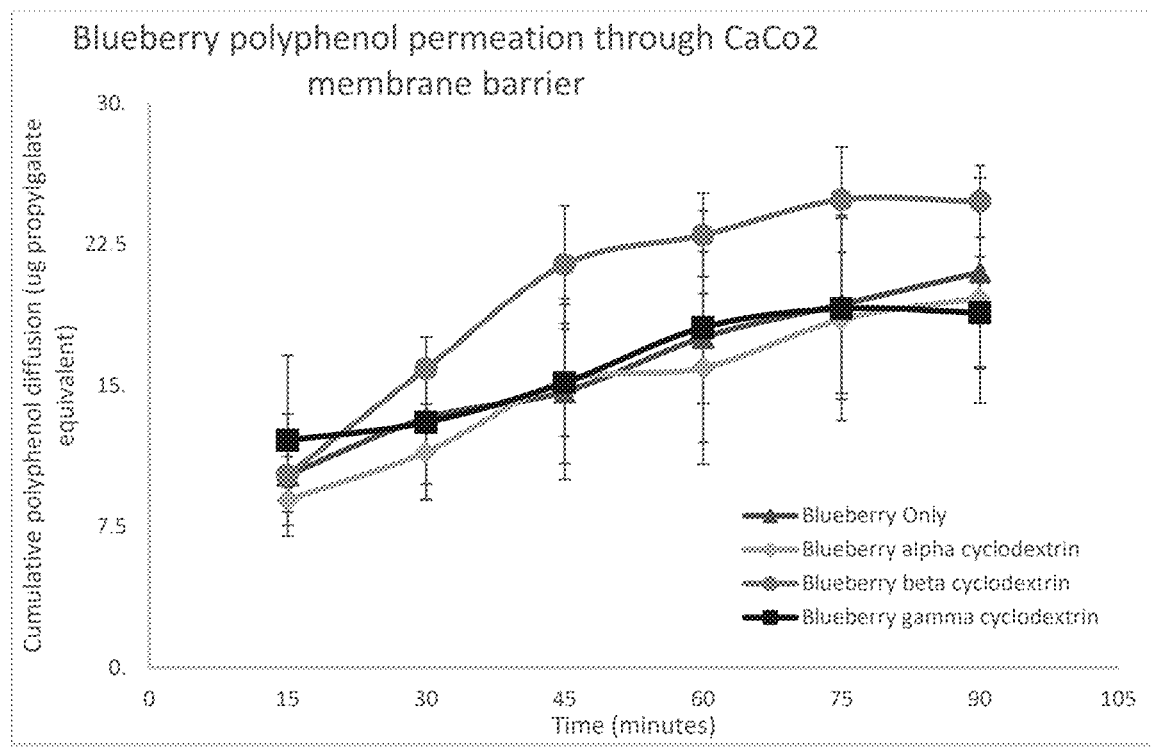
FIG. 10 illustrates blueberry phenolic permeation with cyclodextrin enhancement through a CaCo2 membrane, according to aspects of the present disclosure.
Figure 11:
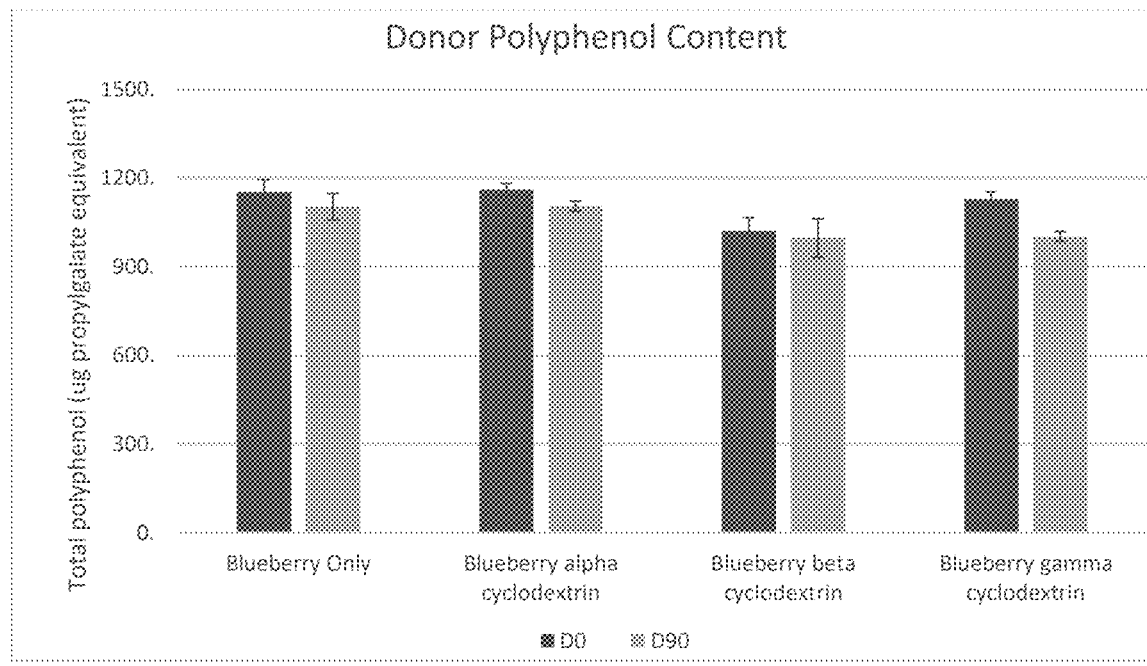
FIG. 11 illustrates donor chamber phenolic content for the blueberry extracts of FIG. 10, according to aspects of the present disclosure.

Further studies were conducted to study enhanced permeation of an enriched blueberry extract with and without cyclodextrins. In these studies we examine the impact of the presence of alpha, beta, and gamma cyclodextrin on the permeability of polyphenols through a CaCo2 model intestinal barrier. In brief 3 mL of blueberry polyphenol solution (~1 mg/ml in 0.1M DPBS) alone or in the presence of 10 mM alpha, beta, or gamma cyclodextrin was added to the donor chamber of each of 3 side by side diffusion cells with a confluent CaCo2 monolayer between (TEER ~900 Ohm*cm2). Samples were taken at 15 minute intervals for 90 minutes and replaced with fresh isotonic DPBS. Samples were taken from donor chamber at time 0 and at 90 minutes. Samples were analyzed using modifications of the Folin-Ciocalteu method for total phenolic content. The results for these studies are shown in FIGS. 10-11 in ug propylgalate equivalents. From the data, it is clear that beta cyclodextrin has the best effect on increasing the permeation of blueberry phenolics thru the CaCo2 membrane.

Example 4

Figure 12:
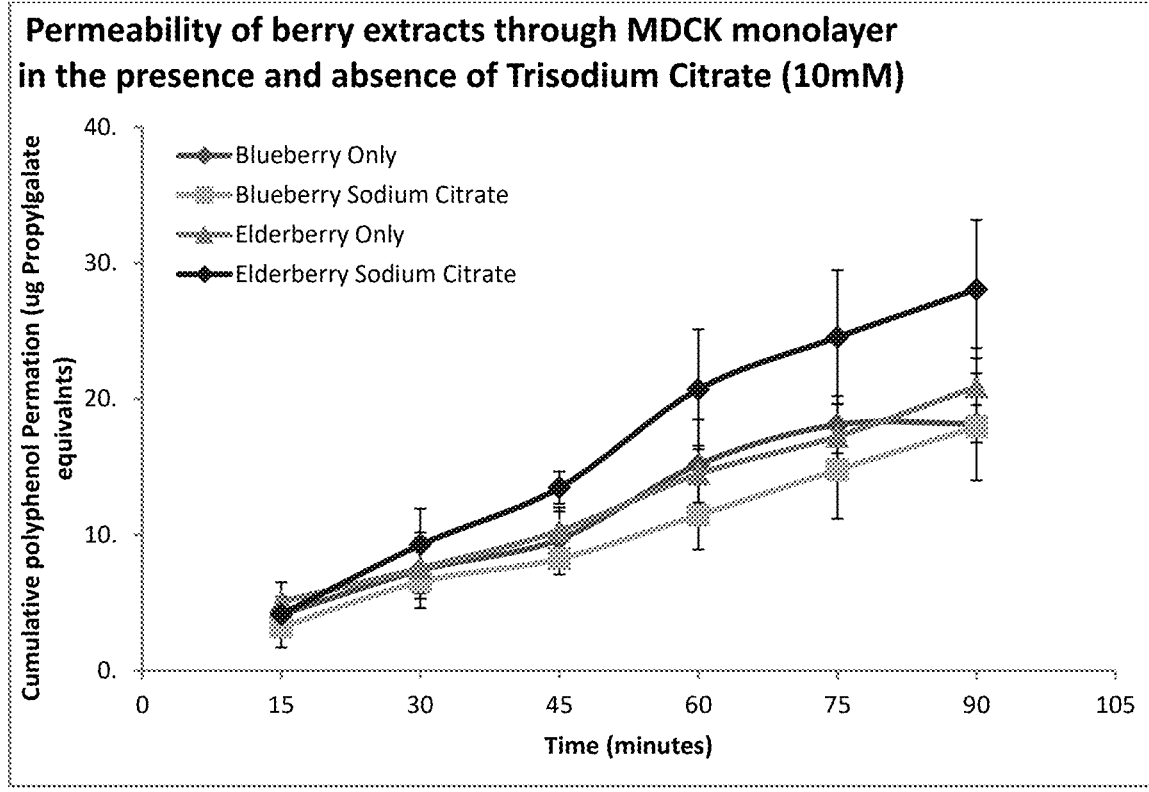
FIG. 12 illustrates blueberry and elderberry phenolic permeability through a MDCK monolayer, with and without trisodium citrate, according to aspects of the present disclosure.
Figure 13:
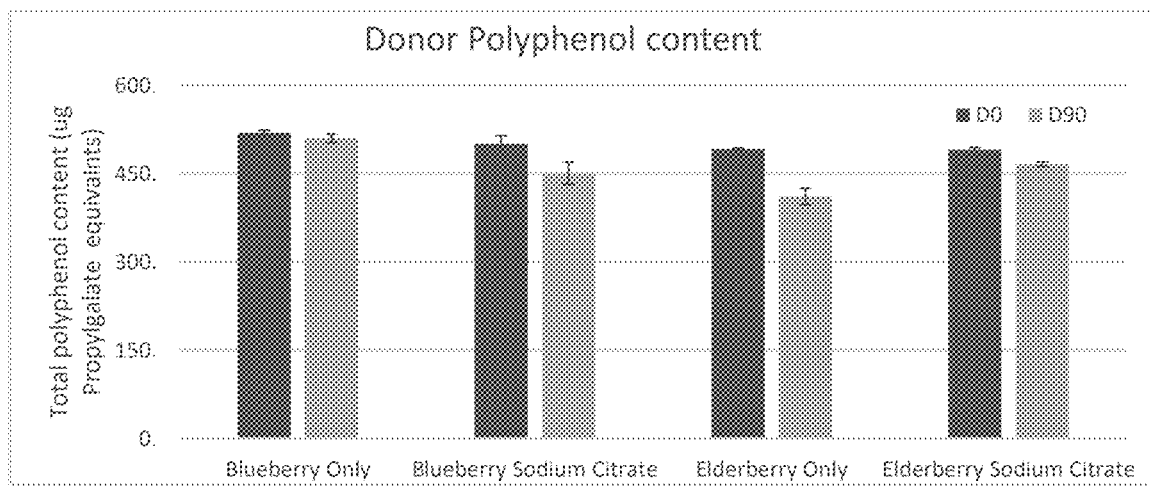
FIG. 13 illustrates donor chamber phenolic content for the extracts of FIG. 12, according to aspects of the present disclosure.

Permeability of blueberry and elderberry in the presence and absence of trisodium citrate through a blood-brain barrier model was also studied. In these studies we examine the permeability of blueberry and elderberry polyphenols in the presence and absence of trisodium citrate through a MDCK model blood-brain barrier. In brief 3 mL of blueberry polyphenol solution or elderberry polyphenol solution (~1 mg/ml berry extract in 0.1M DPBS) alone or in the presence of 10 mM trisodium citrate were added to the donor chamber of each of 3 side by side diffusion cells with a confluent MDCK monolayer between (TEER ~5000 Ohm*cm2). Samples were taken at 15 minute intervals for 90 minutes and replaced with fresh isotonic DPBS. Samples were taken from donor chambers at time 0 and at 90 minutes. Samples were analyzed using modifications of the Folin-Ciocalteu method for total phenolic content. The results for these studies are shown in FIGS. 12-13 in microgram propylgalate equivalents.

Although the presence of trisodium citrate did not significantly (2-tailed Student's T-test) change the permeation of either blueberry phenolics or elderberry phenolics, the elderberry phenolics did show a trend towards greater permeability in the presence of trisodium citrate over time.

Example 5

A clinical study was then undertaken comparing effects of ingesting placebo, creatine monohydrate and disodium phosphocreatine plus blueberry supplements. More particularly, the purpose of the present study was to compare the effects of 28 days of supplementation with phosphocreatine disodium salts plus blueberry extract (PCDSB), creatine monohydrate (CM), and placebo on measures of muscular strength, power, and endurance.

Specifically, increased muscular strength and power have been found to result from the oral supplementation with a blueberry extract in combination with phosphocreatine disodium salts or the present invention, when measured prior to an 28 day supplementation period and after the supplementation period. The values of peak torque and average power measured pre- and post-supplementation period were considerably and unexpectedly enhanced when compared to oral supplementation with creatine monohydrate alone.

More particularly, tests were conducted in which 33 men were randomly assigned to one of three groups:
  *Creatine Group in which 12 test participants ingested a single daily dose for 28 days of 3.0 grams of creatine monohydrate (CM), containing 2.4 grams of creatine;
  **Phosphocreatine/Blueberry Group in which 11 test participants ingested a single daily dose for 28 days of 5.0 grams of phosphocreatine disodium salt containing 2.5 grams of creatine and a blueberry extract; and
  ***Placebo Group in which 10 test participants ingested a single daily dose for 28 days of an inactive placebo containing. microcrystalline cellulose.

The supplements were designed to be as similar as possible in volume, color, and taste, and included 5.0 g of phosphocreatine disodium salts plus 200 mg of blueberry extract in the supplements for the Phosphocreatine/Blueberry Group, 3.0 g of creatine monohydrate for the Creatine Group, and microcrystalline cellulose for the placebo group. The bulk powder mixtures were sieved through a 60-mesh sieve to ensure inform particle size and to get rid of the agglomerates. They were then blended for one hour using an Erweka V-mixer (Model AR 403, Erweka America Inc., Edison, NJ) prior to packaging. Homogeneity of mixing was visually confirmed with the coloring agents used. Blended powders were accurately weighed (mass±1%) into individual foil lined pouches using a calibrated balance (Model SX 410, Denver Instruments, Bohemia, NY) and heat sealed. Five quality control samples were randomly selected from the packaged batch throughout the packaging process to ensure even distribution of contents, verified by mass for all samples and for creatine content in non-placebo samples by HPLC analysis.

The study was implemented as a double-blind, placebo-controlled, parallel design study. The study included a familiarization visit with each of the participants, a pre-supplementation test visit, 28 days of daily supplementation, and a post-supplementation test visit. During the testing visits, the subjects performed the fatigue test of Thorstensson and Karlsson which consisted of 50 maximal, unilateral, concentric, isokinetic leg extensions of the left leg at $180°·s^{-1}$.

After completion of the pre-supplementation test visit, the participants were randomly assigned to one of the three groups described above. The subjects were provided with 28 days of individually packaged packets of powder of their assigned supplement and were instructed to mix the contents of the packet with 8 oz of water and drink it immediately after mixing. The subjects were instructed to maintain their usual exercise and dietary habits throughout the study. Each subject completed a 3-day dietary recall form and a 7-day exercise recall form prior to the pre-supplementation testing visit and prior to the post-supplementation testing visit to determine if there were changes in total caloric and macronutrient intake as well as exercise time during the supplementation period.

Prior to testing, test participants were weighed and height and body mass were measured, with body mass measured again after completion of the study (see Table 5 below). The subjects were screened for any medications, dietary supplements, nutritional products, or dietary programs that could create confusing results. The subjects reported no cardiovascular, metabolic, pulmonary or musculoskeletal diseases.

TABLE 5

|  | Creatine Group (n = 12) | Phosphocreatine/ Blueberry Group (n = 11) | Placebo Group (n = 10) | Composite (n = 33) |
| --- | --- | --- | --- | --- |
| Age (years) | 19.8 ± 1.1 | 20.3 ± 0.9 | 20.6 ± 1.2 | 20.2 ± 1.1 |
| Height (cm) | 179.0 ± 4.0 | 183.5 ± 4.8 | 178.2 ± 6.7 | 180.3 ± 5.5 |
| Body Mass (kg) Pre-Supplement | 85.7 ± 21.4 | 89.6 ± 12.6 | 80.8 ± 11.9 | 85.5 ± 16.1 |
| Body Mass (kg) Post-Supplement | 86.4 ± 21.1 | 89.8 ± 12.9 | 80.6 ± 11.7 | 85.8 ± 16.1 |

Before and after the 28 day supplementation regimens, peak torque, average power and percent decline for peak torque and average power were assessed from a fatigue test consisting of 50 maximal, unilateral, isokinetic leg extensions at $180°·s^{-1}$. The study was designed to compare the effects of 28 days of supplementation with the phosphocreatine disodium salt+blueberry extract with an active control of the creatine monohydrate and also with the inactive placebo of microcrystalline cellulose.

During both pre-supplementation and post-supplementation test visits, peak torque and average power were assessed during the fatigue tests. Peak torque and average power were defined as the mean values from the first three repetitions of the fatigue test. Average power was operationally defined in the as the time averaged, integrated area under the isokinetic torque curve. To calculate the average power, the voltage-time relationships were converted to the isokinetic torque curve by converting the voltage to torque in N·m based on a regression equation. Integration of the area under the torque curve was accomplished using a custom LabVIEW program (National Instrument, Austin, TX, USA) and the average power was then calculated by dividing the integrated area under the torque curve by the time for each isokinetic repetition.

During the 28 days of supplementation, there were no adverse or serious adverse events and all subjects reported consuming all daily doses of their supplement. Analyses for the dietary intake demonstrated no significant interactions for total calories, carbohydrate, fat, or protein intake before and after the 28-day supplementation. Analyses for exercise participation demonstrated no significant interactions or main effects for Time or Group for aerobic and resistance training, or total exercise time from before to after the 28 days of supplementation. See Table 6 below.

TABLE 6

|  | Pre-Supplement | Post-Supplement |
| --- | --- | --- |
| Dietary Intake Calories (kcals) | | |
| Creatine Group* | 1875.7 ± 656.2 | 1706.4 ± 581.5 |
| Phosphocreatine/ Blueberry Group** | 1704.8 ± 464.8 | 1781.7 ± 312.7 |
| Placebo Group*** | 1734.5 ± 377.3 | 1463.8 ± 223.4 |
| Carbohydrates (g) | | |
| Creatine Group* | 173.4 ± 73.5 | 173.4 ± 70.4 |
| Phosphocreatine/ Blueberry Group** | 154.5 ± 67.0 | 161.3 ± 42.0 |
| Placebo Group*** | 187.1 ± 61.4 | 150.1 ± 36.7 |
| Fats (g) | | |
| Creatine Group* | 73.6 ± 30.3 | 66.7 ± 25.2 |
| Phosphocreatine/ Blueberry Group** | 59.8 ± 23.0 | 66.0 ± 24.3 |
| Placebo Group*** | 64.6 ± 16.5 | 58.1 ± 18.4 |

TABLE 6-continued

|  | Pre-Supplement | Post-Supplement |
| --- | --- | --- |
| Protein (g) | | |
| Creatine Group* | 100.5 ± 52.1 | 94.6 ± 35.3 |
| Phosphocreatine/ Blueberry Group** | 100.0 ± 473.7 | 107.7 ± 33.1 |
| Placebo Group*** | 99.4 ± 24.5 | 87.6 ± 23.2 |
| Exercise Participation Aerobic Training (hours/week) | | |
| Creatine Group* | 2.2 ± 2.3 | 1.7 ± 2.3 |
| Phosphocreatine/ Blueberry Group** | 0.9 ± 1.6 | 1.0 ± 1.5 |
| Placebo Group*** | 2.5 ± 2.2 | 2.7 ± 3.0 |
| Resistance Training (hours/week) | | |
| Creatine Group* | 2.0 ± 1.6 | 3.4 ± 2.6 |
| Phosphocreatine/ Blueberry Group** | 3.2 ± 2.3 | 3.2 ± 2.1 |
| Placebo Group*** | 2.4 ± 1.7 | 2.0 ± 1.6 |

TABLE 6-continued

|  | Pre-Supplement | Post-Supplement |
|---|---|---|
| Total Exercise (hours/week) | | |
| Creatine Group* | 4.2 ± 3.0 | 5.0 ± 3.4 |
| Phosphocreatine/Blueberry Group** | 4.2 ± 1.6 | 4.2 ± 1.7 |
| Placebo Group*** | 4.9 ± 2.3 | 4.6 ± 3.2 |

Note:
There were no significant (p > 0.05) differences between groups or across the supplementation for any of the dietary and exercise variables.
*"Creatine Group" refers to test participants who were given 28 daily doses of creatine monohydrate, as further described herein.
**"Phosphocreatine/Blueberry Group" refers to participants who were given 28 daily doses of the phosphocreatine disodium salt/blueberry extract formulations described herein.
***"Placebo Group" refers to the participants who were given 28 daily doses of the placebo described herein.

The results of the peak torque and average power measurements made pre-supplement (i.e., prior to the 28 day supplementation period) and post-supplement (i.e., after the 28 day supplementation period are summarized below in Table 7. It can be seen from Table 7 below, that the Creatine Group, i.e., those test participants taking daily doses of the creatine monohydrate supplement as described herein for 28 days exhibited, on average, a 10.47% increase in peak torque and a 10.22% increase in average power from prior to the test period to after the test period. The Phosphocreatine/Blueberry Group, i.e., those test participants taking daily doses of the phosphocreatine disodium salts+blueberry extract supplement as described herein for 28 days, exhibited, on average, a 14.74% increase in peak torque and a 15.56% increase in average power, from prior to the test period to after the test period. The improvement of 14.74% seen in peak torque for the phosphocreatine/blueberry supplementation represents a 40.78% increase over the creatine monohydrate formulation results. Similarly, the improvement of 15.56% increase seen in average power pre- and post-supplementation period for the phosphocreatine/blueberry group represents a 52.25% increase in average power over that measured for the creatine group. The extent of these differences is quite surprising.

TABLE 7

|  | Pre-Supplement | Post-Supplement | Change (%) | p-value |
|---|---|---|---|---|
| Peak Torque | | | | |
| Creatine Group | 99.95 ± 22.50 | 111.97 ± 24.50* | 10.47 ± 11.03 | 0.009 |
| Phosphocreatine Blueberry Group | 99.90 ± 22.47 | 119.22 ± 29.87* | 14.74 ± 9.37 | <0.001 |
| Placebo Group | 99.82 ± 36.51 | 107.52 ± 44.11 | 4.43 ± 17.29 | 0.112 |
| Average Power (Watts) | | | | |
| Creatine Group | 143.42 ± 33.84 | 159.78 ± 31.20* | 10.22 ± 13.62 | 0.019 |
| Phosphocreatine Blueberry Group | 140.18 ± 32.08 | 170.12 ± 42.68* | 15.56 ± 13.05 | 0.006 |
| Placebo Group | 141.94 ± 51.92 | 150.79 ± 64.30 | 1.72 ± 21.95 | 0.219 |

The % change between the pre-supplement and post-supplement values for Peak Torque for those study participants in the Phosphocreatine/Blueberry Group is highly significant as noted by its p-value of <0.001. The measured improvement in strength as resulting from ingesting the combination supplement comprising phosphocreatine, the disodium salts and blueberry extract enriched in total phones is all but certain. Similarly, with p-value of 0.006, the % change between the pre-supplement and post-supplement values for Average Power for those study participants in the Phosphocreatine/Blueberry Group is also highly significant. In contrast, the p-values for the Placebo Group reflecting the measurements made during this study show little relationship between the changes in strength measurements resulting from ingesting of the placebo supplement.

The basis for these unexpected results is believed to be related to a synergistic effect between the phosphocreatine, the disodium salts and the blueberry extracts. More particularly, because the blueberry extract in the Phosphocreatine/Blueberry supplement is rich in polyphenols including proanthocyanins and anthocyanins which exhibit antioxidant and anti-inflammatory properties and enhanced blood flow it is postulated that the blend of phosphocreatine, blueberry extract, and sodium in the supplements of the present invention may have had synergistic effects that resulted in significant improvements in exercise performance.

It is further believed that this effect would be also strongly exhibited throughout the genus *Vaccinium*, including the commercially available members of the genus such as *Vaccinium angustifolium, V. boreale, V. caesariense, V. corybosum, V. darrowii, V. elliottii, V. formosum, V. fuscatum, V. hirsutum, V. myrsinites, V, myrtilloides, V. pallidum, V. simulatum, V. tenellum, V. virgatum*.

Furthermore, closely similar fruits such as elderberry (especially *Sambucus nigra* and other *Sambucus* spp.), red and black currants (*Ribes* spp.) as well as grape (*Vitus* spp.) are also believed to possibly manifest a similar synergistic effect to that reported herein. *Prunus* (especially blackberries and cherries), *Ribes* (currants), *Vitus* (grapes), *Rubus* (raspberries) and *Fragaria* (strawberries) teas (*Camellia sinensis* and *Camellina* spp.) and other common dietary sources of phenolic compounds.

Other extracts enriched in total phenols from non-fruit but edible plants which are enriched in total phenols so as to contain from 10-95% total phenolics selected from the group of genera consisting of food grade extracts of cinnamon (*Cinnamomum* spp), cocao (*Theobroma* spp), coffee (*Coffea* spp), olive (*Olea* spp) and teas (*Camellia* spp) may also find particular utility as the source of phenolic compounds in the present inventions.

This being said, the most preferred embodiments of the present invention comprise blueberry and/or bilberry extract incorporated in the oral supplements of the present invention contain enrich in total phenols. In these embodiments, blueberries from which the extracts are produced are from throughout genus *Vaccinium*, with the most preferred blueberries used in the present invention selected from a group of commercial sources comprising *Vaccinium angustifolium, V. boreale, V. caesariense, V. corybosum, V. darrowii, V.*

*elliottii, V. formosum, V. fuscatum, V. hirsutum, V. myrsinites, V, myrtilloides, V. pallidum, V. simulatum, V. tenellum, V. virgatum.*

Other preferred embodiments of the present invention include one or more selected from genera *Prunus* spp., *Ribes* spp., *Vitus* spp., *Rubus* spp. and *Fragaria* spp., wherein the enriched extracts of the selected fruit(s) include total phenols comprising from 10-95% of the extract.

Other embodiments of non-fruit, edible extracts include extracts enriched in total phenols from genera *Cinnamomum* spp, *Theobroma* spp, *Coffea* spp, *Olea* spp, and *Camellia* spp are acceptable as the source of phenolic compounds in the present invention, provided the total phenols from these sources contribute to the 10-95% total phenols in the oral supplements of the present invention.

More specifically, in the most preferred embodiments of the present invention, the oral supplement comprises an extract enriched in total phenols, wherein the extract is extracted and concentrated from fruit selected from a group consisting of members of genera *Vaccinium* and *Sambucus*, together with a phosphocreatine salt. Most preferably, a daily dosage of the oral supplement taken in one or more doses, with the total daily dosage containing at least at least 1.0 gram of creatine and at least 0.05 grams of the extract, with the extract containing at least 10 milligrams of total phenols. Preferably, this oral supplement contains from 10% to 80% total phenols. It is also important that the total phenols in the oral supplement include anthocyanins and proanthocyanins, with the weight ratio of the creatine from the phosphocreatine salt to the anthocyanins and proanthocyanins preferably from 75:1 to 1:10, inclusive. Such an oral supplement may also include trisodium citrate to further enhance uptake and efficacy of the phenols and phosphocreatine.

Preferably, this most preferred oral supplement according of the present invention includes one or more of genera *Vaccinium* and *Sambucus* are selected from the group consisting of elderberries, blueberries, bilberries and cranberries.

The preferred forms of delivery of the oral supplements of the present invention include tablets, capsules, gummies, troches, syrups, liquids, powders, gels and films. Such oral supplements may be characterized as nutritional supplements, foods, beverages and/or feed compositions. Typically, a carrier may also be included in the oral supplements of the present invention and the oral supplements may also be enteric-coated. In any case, the extract enriched in total phenols should be present in the oral supplements of the present invention a concentration sufficient to enhance muscular strength greater than that experienced by ingestion of the phosphocreatine salt alone, and wherein a weight ratio of the total of creatine from the phosphocreatine salt to the total phenols in the extract is from 75:1 to 1:10, inclusive.

In other supplements of the present invention, non-fruit sources of the extract enriched in total phenols include one or more members of genera *Cinnamomum, Theobroma, Coffea, Olea* and *Camellia*.

In oral supplements of the present invention, where the phosphocreatine salt component is selected from the group consisting of phosphocreatine disodium salt, phosphocreatine dipotassium salt and phosphocreatine di(tris) salt, preferably, the total phenols and the phosphocreatine together constitute the bioactive components whose total weight is at least 250 milligrams, and wherein a weight ratio of the bioactive components to sodium from the selected phosphocreatine salt is from 20:1 to 1:10, inclusive.

Alternatively, the creatine in the oral supplements of the present invention may be sourced from creatine monohydrate and/or creatine hydrochloride. Further the oral supplement may also include an organic acid sodium salt selected from the group consisting of trisodium citrate, tartaric, oxalic and malic acid sodium salts. In these formulations, a daily dosage of the oral supplement contains at least 0.05 grams of the extract, at least 10 milligrams of total phenols, at least 0.10 grams of the organic acid sodium salt and at least 1.0 grams of the creatine. Preferably, these oral supplements contain at least 12% total phenols, and more preferably at least 25% total phenols.

In an alternative embodiment of the present invention, the oral supplement includes an extract enriched in total phenols, with the extract sourced from members of genera *Vaccinium* and *Sambucus*, together with creatine from a phosphocreatine salt, creatine monohydrate and/or creatine hydrochloride; and trisodium citrate. In this formulation, total phenols and the selected creatine constitute the bioactive components and a dose of the oral supplement contains at least 0.5 grams total of the bioactive components, and a weight ratio of the one or more bioactive components to sodium from the trisodium citrate is from 20:1 to 1:10, inclusive.

In other embodiments of the oral supplements of the present invention also include arginine present in a daily dosage of from 100 milligrams to 10 grams. In yet other embodiments of the oral supplements of the present invention amino acid(s) may also be present in the form of leucine, valine, isoleucine, arginine, alanine, glutathione. In these and other embodiments of the present invention, cyclodextrin and/or polyethylene glycol may be included.

Thus, it has been discovered that significant improvements in membrane permeation and uptake of phenolic compounds can be seen when combined with certain food grade, sodium-containing organic salts, and such improved membrane permeation and uptake is not seen when combined the phenolic compounds with non-organic acid sodium salts. Use of sodium chloride and calcium and other organic acid salts are not expected to show significant improvements in membrane permeation, thus limiting the utility to sodium containing organic acids only. However, such improvements have been found to require significant concentrations and/or amounts of the phenolic compounds, as such improvements are not evident with small amounts or lower/dilute concentrations of unenriched phenolic compounds. Also, the uptake of the phenolics compounds requires significant amounts of the sodium source from organic acid sodium salts be present relative to the phenolic extract amounts.

In particular, organic salts such as sodium citrates, especially trisodium citrate, and also tartaric, oxalic and malic acid sodium salts enhance uptake and bioavailability of phenolic compounds in foods having significant amounts of anthocyanins and proanthocyanins which have been extracted and thereafter processed to be enriched in total phenols, when combined in an oral supplement. Thus, variations of the present invention are intended to encompass oral supplements comprising an extracted enriched in total phenols, wherein the extract has been extracted and concentrated from food-grade products belonging to any of the following genera: *Vaccinium, Sambucus, Prunus, Ribes, Vitus, Rubus, Fragaria, Cinnamomum, Theobroma, Coffea, Olea* and *Camellia*, and the extract enriched in total phenols is combined with one or more organic acid salt selected from the group consisting of sodium citrates, including trisodium citrate, and also tartaric, oxalic and malic acid sodium salts.

Most preferably, the weight ratio of the extract enriched in total phenols to the organic acid sodium salt is from 20:1 to 1:10 inclusive.

The invention claimed is:

1. An oral supplement comprising:
   an extract enriched in total phenols,
   the total phenols comprising at least 10% by weight of the extract;
   wherein the extract is extracted from foods selected from the group consisting of members of genera from fruit selected from a group consisting of members of genera *Vaccinium, Sambucus, Prunus, Ribes, Vitus, Rubus, Fragari, Theobroma, Coffea, Olea* and *Camellia;*
   an organic acid sodium salt selected from the group consisting of sodium citrates, tartaric sodium salts, oxalic acid sodium salts and malic acid sodium salts,
   wherein a weight ratio of the extract enriched in total phenols to the organic acid sodium salt is from 20:1 to 1:10 inclusive.

2. The oral supplement according to claim 1, wherein the extract comprises from 10% to 80% by weight total phenols.

3. The oral supplement according to claim 1 wherein the extract comprises at least 25% by weight total phenols.

4. The oral supplement according to claim 1 wherein the extract comprises at least 40% by weight total phenols.

5. The oral supplement according to claim 1, wherein a form of the oral supplement comprises tablets, capsules, gummies, troches, syrups, liquids, powders, gels and or films.

6. The oral supplement according to claim 1, wherein a form of the oral supplement comprises nutritional supplements, foods, beverages or feed compositions.

7. The oral supplement of claim 1 further comprising a carrier.

8. The oral supplement of claim 1 further comprising an enteric-coating.

9. An oral supplement comprising:
   an extract enriched in total phenols,
   the total phenols comprising at least 10% by weight of the extract;
   wherein the extract is extracted from fruit selected from a group consisting of members of genera *Vaccinium, Sambucus, Prumis, Ribes, Vitus, Rubus, Fragaria, Theobroma, Coffea, Olea* and *Camellia;* and
   a phosphocreatine salt.

10. An oral supplement comprising:
    an extract enriched in total phenols,
    the total phenols comprising at least 10% by weight of the oral supplement;
    wherein the extract is extracted and concentrated from fruit selected from the group consisting of members of genera *Vaccinium* and *Sambucus;* and
    a phosphocreatine salt selected from the group consisting of phosphocreatine disodium salt, phosphocreatine dipotassium salt and phosphocreatine di(tris) salt,
    wherein the total phenols and the phosphocreatine together constitute a bioactive component whose total weight is at least 250 milligrams, and
    wherein a weight ratio of the bioactive component to sodium from the selected phosphocreatine salt is from 20:1 to 1:10, inclusive.

11. The oral supplement according to claim 9 or 10 further comprising:
    trisodium citrate,
    wherein the total phenols contain anthocyanins and proanthocyanins and the weight ratio of the creatine from the phosphocreatine salt to the total phenols is from 75:1 to 1:10, inclusive.

12. The oral supplement according to claim 9 or 10, wherein in the extract comprises from 10% to 80% total phenols.

13. The oral supplement according to claim 9 wherein a dosage of the oral supplement contains
    at least at least 1.0 gram of creatine and
    at least 0.05 grams of the extract, and
    the extract contains at least 15 milligrams of total phenols.

14. The oral supplement according to claim 9 or 10, wherein a form of the oral supplement comprises tablets, capsules, gummies, troches, syrups, liquids, powders, gels or films.

15. The oral supplement according to claim 9 or 10, wherein a form of the oral supplement comprises nutritional supplements, foods, beverages or feed compositions.

16. The oral supplement of claim 9 or 10, further comprising a carrier.

17. The oral supplement of claim 9 or 10, further comprising an enteric-coating.

18. An oral supplement comprising:
    an extract enriched in total phenols,
    the total phenols comprising at least 10% by weight of the extract;
    wherein the extract is extracted and concentrated from fruit selected from the group consisting of members of genera *Vaccinium, Sambucus, Prumis, Ribes, Vitus, Rubus, Fragaria, Theobroma, Coffea, Olea* and *Camellia;*
    a creatine selected from the group consisting of a phosphocreatine salt, creatine monohydrate and creatine hydrochloride; and
    an organic acid sodium salt,
    wherein the total phenols and the selected creatine constitute the bioactive components; and
    a weight ratio of the one or more bioactive components to sodium from the organic acid sodium salt is from 20:1 to 1:10, inclusive.

19. The oral supplement according to claim 18, wherein in the extract comprises from 10% to 80% by weight total phenols.

20. The oral supplement according to claim 18, the oral supplement contains at least 0.5 grams total of the bioactive component.

21. The oral supplement according to claim 18, wherein in the extract comprises at least 25% by weight total phenols.

22. The oral supplement according to claim 18, wherein a form of the oral supplement comprises tablets, capsules, gummies, troches, syrups, liquids, powders, gels or films.

23. The oral supplement according to claim 18, wherein a form of the oral supplement comprises nutritional supplements, foods, beverages or feed compositions.

24. The oral supplement of claim 18 further comprising a carrier.

25. The oral supplement of claim 18 further comprising an enteric-coating.

26. The oral supplement of any of claim 1, 9, 10, or 18 further comprising a dosage from 100 milligrams to 10 grams arginine.

27. The oral supplement of any of claim 1, 9, 10, or 18 further comprising one or more amino acids selected from the group consisting of leucine, valine, isoleucine, arginine, alanine and glutathione.

28. The oral supplement of any of claim 1, 9, 10, or 18 further comprising additives selected from the group consisting of trisodium citrate, cyclodextrin and polyethylene glycol.

* * * * *